United States Patent [19]
Lewinski et al.

[11] Patent Number: 5,285,856
[45] Date of Patent: Feb. 15, 1994

[54] MECHANICAL SUSPENSION DEVICE FOR PILER OF SUGAR CANE LOADERS

[75] Inventors: Juliusz Lewinski; Ryszard Serwatowski, both of Querétaro, Mexico

[73] Assignee: Centro de Investigation v Asistencia Tecnica del Estado de Queretaro A.C., Queretaro Qro., Mexico

[21] Appl. No.: 615,290

[22] Filed: Nov. 19, 1990

[30] Foreign Application Priority Data

Dec. 15, 1989 [MX] Mexico ................. 18734

[51] Int. Cl.⁵ .............................. E02F 3/76
[52] U.S. Cl. .................. 172/816; 267/170; 414/720; 172/500
[58] Field of Search ............. 414/720; 267/170, 166, 267/71; 56/15.7, 15.8, 15.9, DIG. 10; 440/56, 65; 172/816, 500

[56] References Cited

U.S. PATENT DOCUMENTS

| | | | |
|---|---|---|---|
| 1,541,909 | 6/1925 | Early | 267/170 |
| 2,674,380 | 4/1954 | Boudreaux | 414/132 |
| 2,874,854 | 2/1959 | Thornton | 414/132 |
| 3,666,257 | 5/1972 | Sorteberg | 267/170 |
| 4,609,318 | 9/1986 | Rodrique et al. | 414/132 |
| 4,614,476 | 9/1986 | Pinto | 414/729 |

FOREIGN PATENT DOCUMENTS 2835435 2/1980 Fed. Rep. of Germany ...... 267/166

OTHER PUBLICATIONS

Reducao de Materia Estranha em Operacao de Carregamento Mecanico by Odecio Zanca (Santal).

*Primary Examiner*—Robert J. Spar
*Assistant Examiner*—Donald W. Underwood
*Attorney, Agent, or Firm*—Finnegan, Henderson, Farabow, Garrett & Dunner

[57] ABSTRACT

A sugar cane piler having a mechanical spring suspension device connected between the piler and the front end of the loader, the device including a precompressed spring to absorb a major portion of the weight of the piler and reduce the force of the piler acting on the ground. The device permits the piler to readily float over the ground and minimizes penetration of the piler's tips into the ground.

5 Claims, 2 Drawing Sheets

MECHANICAL SUSPENSION DEVICE FOR PILER OF SUGAR CANE LOADERS

BACKGROUND OF THE INVENTION

This invention relates to a sugar cane piler having a mechanical spring suspension device in place of the conventional chain used in known sugar cane pilers.

The mechanical spring device decreases by about 80% the force with which the tips of the piler act on the ground, thus obtaining a good flotation of the piler on the ground surface. By reducing the force of interaction between the piler and the ground, soil penetration by the piler's tips is decreased resulting in less contamination of the cane with stones, soil and other extraneous materials during bundling of the cane. Destruction of the cane's roots by the piler's tips is also avoided. The mechanical suspension device is characterized by having a cylinder closed at both ends, in which is located a previously compressed spring that is coupled to a rod which, in turn, is connected at one end to a plate and at the other end to a yoke.

Conventional sugar cane pilers have a rigid construction and consist of a pair of spaced apart vertical plates cut in the form of parabolic or eliptical curves, with tips at the ends. These plates are welded to a frame structure formed of lateral and longitudinal tubes. The frame is articulated to the main frame of the machine and suspended by a chain connected to an articulated arm that is actuated by a hydraulic cylinder. The lowest position of the piler is limited by the cylinder's stroke and the length of the chain. During cane bundling the force of interaction between the piler and the soil is so high that it is difficult to achieve a floating effect so the piler's tips tend to penetrate into the ground.

This penetration of the piler's tips causes contamination of the cane with stones, soil and other undesirable materials. There is also the danger of uprooting and destroying the cane stumps.

Many attempts have been made to try and reduce soil penetration by the piler's tips and to increase the flotation effect. One of the most common methods is to mount skids on the piler to reduce soil penetration by the piler's tips and improve the piler's floating effect. However, this doesn't occur because the skids have to have a large contact surface between the piler and the soil in order to effectively reduce penetration.

Some sugar cane loaders use an additional chain to reduce soil penetration when the ground is uniform, but the floating effect is still poor and when the ground is uneven, some of the cane is left on the ground without bundling.

Many inventions have been patented with the purpose of achieving a better piler floating effect. In U.S. Pat. No. 4,614,476, the piler consists of two parts: one upper rigid part as in the conventional design and a lower part which can be moved with respect to the upper part. Since the lower part comprises only a small proportion of the mass of the whole piler, it acts on the ground with a relatively small force. But since only the lower part floats, the floating effect in this design is satisfactory.

The above patent discloses many design alternatives for the two-part piler, but in practice no solution has been successful.

Problems caused by the rigidity of the lower part as well as the introduction of stones and soil between the piler's movable parts have been the main factors why this two-part piler has not been successful. Also this design requires a high investment cost because the whole conventional piler must be replaced by the new one.

U.S. Pat. Nos. 4,609,318; 2,674,380; and 2,874,854 show pilers where some elements have been added to the piler to help in bundling the cane. Those elements can perform oscillatory, linear or rotary movements. The most interesting solution appears to be a rotary mechanism adapted to the conventional piler, where toothed wheels mounted outside the walls of the piler help to bundle the cane. With this solution, the reaction force of the cane on the piler is reduced and, in turn, the force of penetration by the piler's tips is reduced. However, this design does not reduce the soil penetration force provided by the piler's own weight. Besides it is more expensive, because of the use of additional hydraulic motors. Moreover, it is not recommended for use in stony fields.

SUMMARY OF THE INVENTION

This invention relates to a mechanical spring suspension device for the piler of sugar cane loaders, characterized by having a cylinder closed at both ends by a plate and inside of which is located a spring that has been previously compressed. The spring is in contact at one end with an intermediate plate in the cylinder and its other end rests on an end plate of the cylinder. The spring acts on a rod which is connected to the intermediate plate at its upper end and to a yoke at its lower end. Above the intermediate plate there is a chamber which allows for free movement of the rod. A second yoke is welded to the outside of this chamber which forms the upper end of the device.

The general objective of the present invention is to provide a device which reduces the amount of soil and other extraneous matters picked up by the piler tips during the operation of conventional sugar cane loaders. This device uses a mechanical spring suspension device instead of the chain in a conventional piler and decreases by 80% the force of interaction between the soil and the conventional piler tips in a mid-working position. This device achieves a better floating of the piler with respect to the ground, allowing it to follow, during the bundling of the cane, the profile of the ground with a minimum of penetration of the soil, while avoiding uprooting and destruction of cane stumps.

Another objective of the invention is to provide a suspension device formed by a cylinder and a rod connected by a helical spring which does not require any alteration to a conventional piler since the device simply replaces the chain used in conventional machines. The suspension device can be used on all types of conventional sugar cane loaders. This solution helps the operator because he does not need to make any special movements of the control of the piler's position, since with this solution, flotation of the piler is sufficiently effective to avoid excessive penetration of the soil or destruction of the cane's roots.

DETAILED DESCRIPTION OF THE INVENTION

Figure 1:
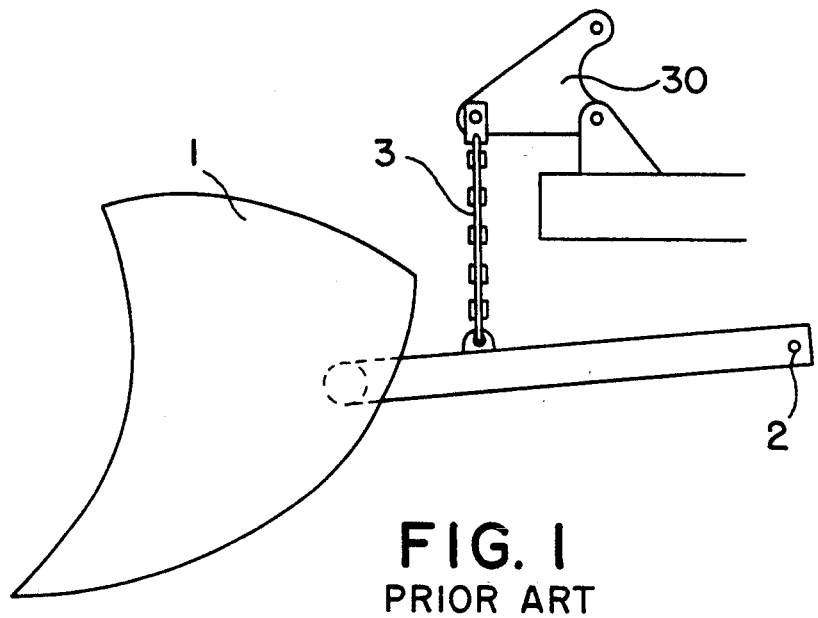
FIG. 1 is a lateral side view of a conventional piler for a commercial machine.

With reference to FIG. 1, a conventional piler 1 is pivotally connected at point 2 to the main body of the machine or loader (not shown) and it is suspended by a chain 3 from a pivotally mounted arm 30 that is operated by a hydraulic cylinder (not shown). Chain 3 places the piler at the desired vertical position as well as ensures the piler floats over the ground. Flotation of piler 1 is essential in order for it to follow the profile of the ground and avoid soil penetration and root destruction. Because the piler exerts a large contact force with the soil due to its own weight, the floating effect is poor, particularly over soft soil.

Figure 2:
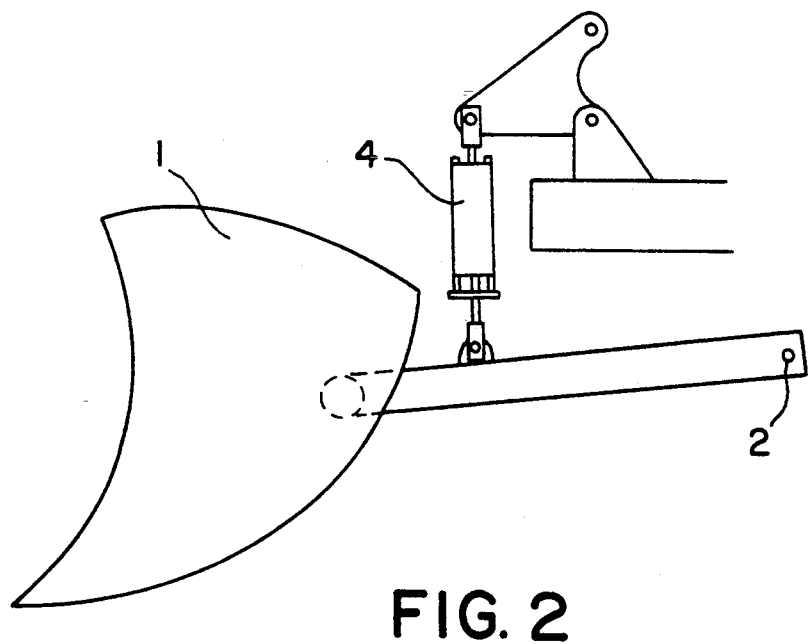
FIG. 2 is a lateral side view of a conventional piler with the suspension device of this invention.

FIG. 2 is a lateral side view of a conventional piler 1 suspended by the mechanical suspension device 4 of the invention. The device 4 absorbs between 80 and 100% of the force originating from the weight of the piler and the already gathered or bundled cane, resulting in a reduced contact force between the piler and the soil and ensuring that the piler stays even with the soil to avoid introduction by about 60% of soil and stones in the cane and to avoid possible destruction of the cane's roots.

Figure 3:
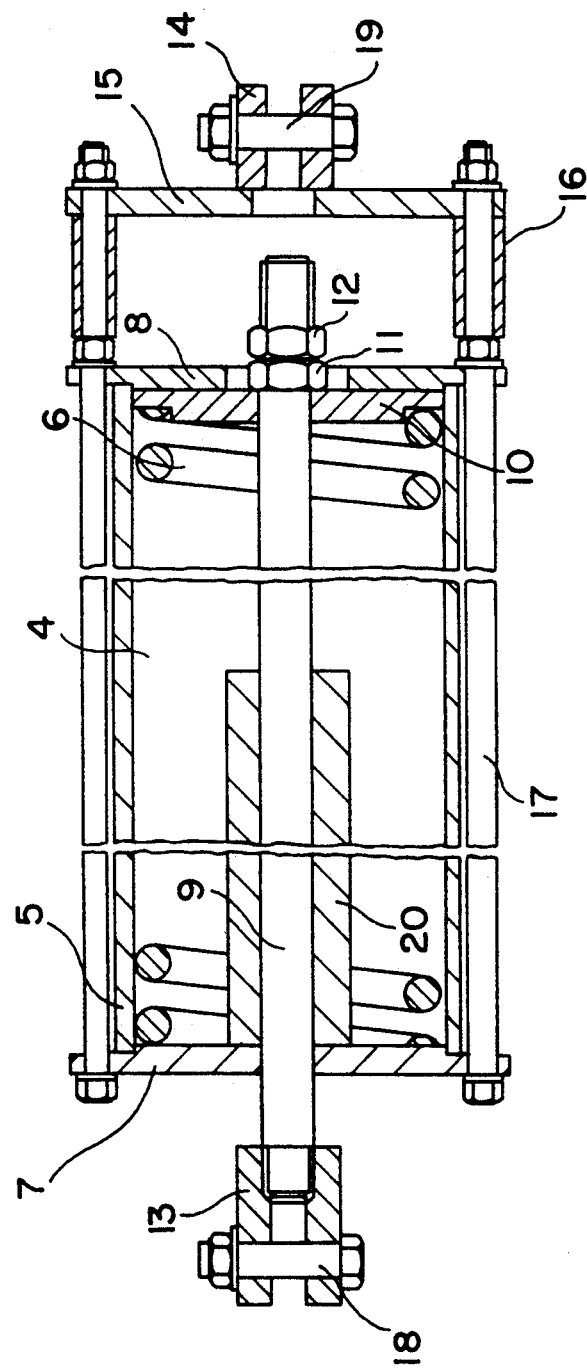
FIG. 3 is a longitudinal cross-sectional view of the suspension device.

FIG. 3 is a longitudinal cross-sectional view of the mechanical suspension device 4 of the piler. This device includes a cylinder 5 inside of which is located a previously compressed spring 6. The cylinder is closed at both ends by plates 7 and 8. Inside of the spring is located a rod 9 which is connected at one end to a plate 10 by means of nuts 11 and 12 and at the other end, outside of the chamber to a yoke 13. A second yoke 14 is connected to a plate 15 spaced from plate 8 by four spacers 16 and connected to the main body of the cylinder by four threaded rods 17. Rods 17 permit the assembly or disassembly of the cylinder in the field. The distance between plates 15 and 8 allow for free movement of the end of rod 9 with respect to cylinder 5, so a floating is permitted in case an obstacle is encountered. Yokes 13 and 14 permit connection of the device by means of bolts 18 and 19 between the machine and the piler, respectively as shown in FIG. 2.

During operation of the piler, the force generated by the weight of the piler and the added force generated by the already bundled cane, causes compression of the spring, thereby reducing the force between the tips of the piler and the ground. Element 20 serves as a limiter of the compression of spring 6.

The device can be placed between the piler and the machine by means of a length of a chain or any unidirectional mechanism capable of facilitating flotation of the whole assembly over a very high or unexpected obstacle. Nuts 11 and 12 can be used to adjust the maximum distance between the yokes 13,14 at a middle working position. This adjustment can also be made by changing the relative position of the yoke 13 which respect to rod 9.

The suspension device can also be welded together so that it cannot be dissembled, thus reducing the number of parts and the costs of manufacturing it.

What is claimed is:

1. A piler for a mechanized sugar cane loader having a front end comprising, in combination, at least two spaced apart, vertical plates mounted on a frame, each having a curved forward facing edge ending in a forward tip, for pushing cut sugar cane on top of the ground into bundles, means pivotally connecting said piler to the front end of said loader allowing it to pivot in a vertical plane and a suspension device connected between the frame of the piler and the loader for suspending the piler the desired distance from the ground while permitting the piler to float up and down over the ground's surface and minimize ground penetration by the plate's tips as the piler is pushed forward by the loader, said device comprising a cylinder closed at both ends by an end plate, each of said end plates having an axially located opening therein, a compressed helical spring located in said cylinder, one end of said spring being in contact with a first one of said end plates and the other end in contact with an intermediate plate moveable at least partially within said cylinder between said end plates, said intermediate plate resting against the second one of said end plates under the force of the spring when the device is not in use and said spring being precompressed in the space between said plates an amount sufficient to support a major portion of the weight of the piler when the device is in use, a rod located axially of the spring, said rod being connected at one end to said intermediate plate and extending beyond said intermediate plate and slidably through the opening in said second end plate, adjusting means on the extended end of the rod for adjusting the relationship between said rod and said intermediate plate, the opposite end of said rod extending slidably through the opening in said first end plate and connection means on the end of the rod adjacent the cylinder's first end plate and on the cylinder adjacent its second end plate for connecting the device between the piler and the loader.

2. The piler of claim 1, wherein said connection means each comprise a fork with a removable bolt passing through the fork for detachably connecting the ends of the suspension device to the piler and the loader.

3. The piler of claim 1, wherein the connection means on the cylinder adjacent its second end plate is welded to another plate spaced from said second end plate and connected thereto by a plurality of spacers and bolts.

4. The piler of claim 1, including a stopper inside of the cylinder limiting the path of travel of the intermediate plate and the degree of compression of the spring.

5. The piler of claim 1, wherein the adjusting means comprises threads on the extended end of the rod and at least one nut threaded on the rod for adjusting the relationship between the rod and the intermediate plate.

* * * * *